(No Model.)
J. FUCHS.
GRAFTING IMPLEMENT.
No. 505,651. Patented Sept. 26, 1893.
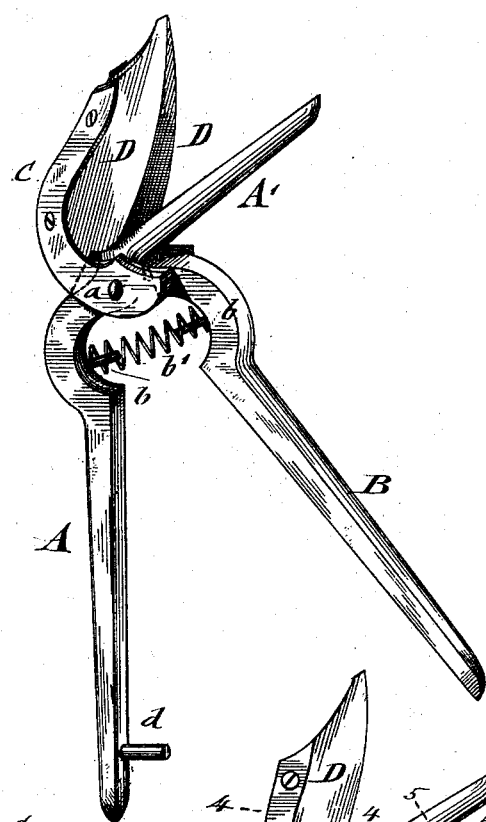
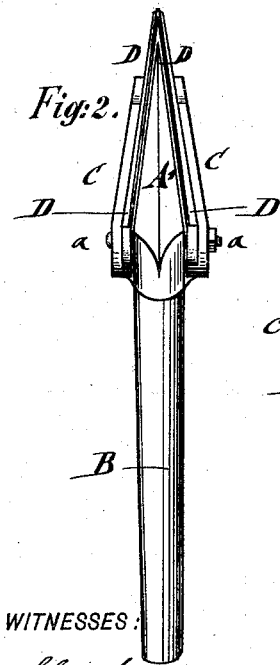
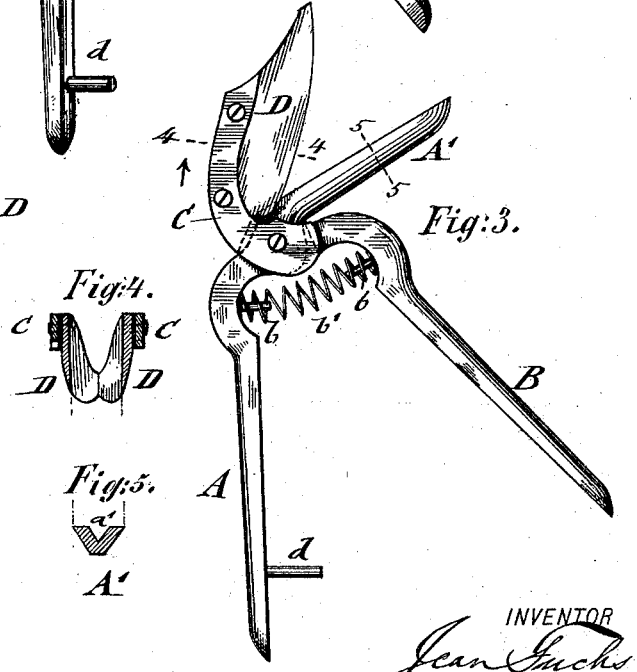
WITNESSES:
Charles Schroeder.
Charles Bles
INVENTOR
Jean Fuchs
BY
Joepue & Raegener
ATTORNEYS.

UNITED STATES PATENT OFFICE.

JEAN FUCHS, OF PORTO FERRAJO, ITALY.

GRAFTING IMPLEMENT.

SPECIFICATION forming part of Letters Patent No. 505,651, dated September 26, 1893.

Application filed February 18, 1892. Serial No. 421,926. (No model.) Patented in England January 27, 1892, No. 1,653.

*To all whom it may concern:*

Be it known that I, JEAN FUCHS, a citizen of the Republic of France, and a resident of Porto Ferrajo, on the island of Elba, Italy, have invented certain new and useful Improvements in Grafting Implements, (for which Letters Patent have been obtained in Great Britain, No. 1,653, dated January 27, 1892,) of which the following is a specification.

This invention relates to an improved implement for grafting vines and other plants in such a manner that a V-shaped joint is obtained between the parts to be grafted, whereby a large and intimate contact is formed between said parts and the quick growing together of the same produced; and the invention consists of a grafting implement formed of fulcrumed handles, of which one handle is provided with two curved and converging tines to which blades are attached that abut at their outer ends and that are supported at an angle of inclination to each other so as to work in connection with the tapering tongue of the other handle which passes inwardly between said blades so as to produce a V-shaped cut on the parts to be grafted.

In the accompanying drawings, Figure 1 represents a perspective view of my improved grafting implement. Fig. 2 is an end-elevation. Fig. 3 is a side-elevation of the same. Figs. 4 and 5 are vertical transverse sections, on lines 4 4 and 5 5, of Fig. 3. Fig. 6 shows the cut produced by the grafting implement on the parts to be grafted, and Fig. 7 shows a side-view of the grafted parts as tied together, so as to form the grafting-joint.

Similar letters of reference indicate corresponding parts.

Referring to the drawings, A and B represent the handles of my improved grafting implement or shears, which handles are fulcrumed at $a$ and provided below the fulcrum at their inner sides with fixed pins $b$ $b$, to which a helical cushioning spring $b'$ is attached by which the handles are moved apart whenever the pressure on the same is released.

To the outer end of the handle A is applied a stop-pin $d$, against which the handle B abuts when the handles are fully pressed together.

The handle A is provided with a tapering end or tongue A' that is preferably provided with a longitudinal tapering groove or depression $a'$, while the forked handle B is provided with two curved and converging plates or tines C which are attached to the forked and fulcrumed end of the handle B.

To each plate or tine C is attached, preferably by means of fastening-screws, a cutting-blade D, which blades abut at their outer ends, but which recede from each other so as to form a V-shaped space between the same. The edges of the blades D D are slightly curved, so as to exert in connection with the edges of the tapering tongue A' a V-shaped shear-cut on the twig to be grafted.

For joining the parts to be grafted, the end of the twig, as well as the shoot to be grafted, are both subjected to the action of the grafting shears, so that a tapering point is formed at the end of the former and a V-shaped recess at the end of the latter. The pointed and recessed ends of the twig and shoot are then connected and firmly tied together by means of suitable material, so that an intimate joint is obtained between the parts, as shown in Figs. 6 and 7.

The advantages of the V-shaped joint produced by my improved grafting shears are obvious: It produces the quick and reliable growing together of the parts and furnishes a larger and stronger joint that is better able to resist the influences of the weather than the ordinary grafting-joint heretofore in use.

Having thus described my invention, I claim as new and desire to secure by Letters Patent—

1. A grafting implement composed of fulcrumed handles, one handle being provided with converging cutting blades abutting at their outer ends forming a V-shaped recess, and the other handle being provided with a V-shaped tongue adapted to shut into said V-shaped recess, substantially as described.

2. A grafting implement composed of two fulcrumed handles, one of said handles being provided with converging cutting blades having curved cutting edges, said blades abutting at their outer ends forming a V-shaped recess, and the other of said handles being provided with a straight V-shaped tongue adapted to shut into said V-shaped recess and with a longitudinal groove for receiving the twig to be cut, substantially as described.

In testimony that I claim the foregoing as my invention I have signed my name in presence of two subscribing witnesses.

JEAN FUCHS.

Witnesses:
A. RERANO,
G. APPIANI.